United States Patent [19]
Foss et al.

[11] Patent Number: 5,335,347
[45] Date of Patent: Aug. 2, 1994

[54] METHOD AND APPARATUS FOR SCOPED INTERPROCESS MESSAGE SWITCHING

[75] Inventors: Carolyn L. Foss, Palo Alto; Dwight F. Hare, Menlo Park; Richard F. McAllister, Palo Alto; Tin A. Nguyen, Danville; Amy Pearl, Mountain View; Sami Shalo, Palo Alto, all of Calif.

[73] Assignee: Sun Microsystems, Inc., Mountain View, Calif.

[21] Appl. No.: 644,942

[22] Filed: Jan. 23, 1991

[51] Int. Cl.$^5$ .............................................. G06F 9/44
[52] U.S. Cl. .................................. 395/650; 364/280; 364/284.3; 364/284.4; 364/DIG. 1
[58] Field of Search ........................................ 395/650

[56] References Cited

U.S. PATENT DOCUMENTS

| | | | |
|---|---|---|---|
| 4,412,285 | 10/1983 | Neches et al. | 364/200 |
| 4,466,060 | 8/1984 | Riddle | 364/200 |
| 4,630,196 | 12/1986 | Bednar, Jr. et al. | 364/200 |
| 5,060,150 | 10/1991 | Simor | 364/200 |
| 5,179,708 | 1/1993 | Gyllstrom et al. | 395/725 |
| 5,212,792 | 5/1993 | Gerety et al. | 395/650 |

Primary Examiner—Gareth D. Shaw
Assistant Examiner—J. H. Backenstose
Attorney, Agent, or Firm—Blakely Sokoloff Taylor & Zafman

[57] ABSTRACT

A method and apparatus for scoped interprocess message switching between a sender process and a plurality of receiver processes is disclosed. Messages supported may be scoped to message scopes of a message scope type of "Session" or one of a plurality of non-session message scope types including a message scope type of "File". Messages may also be scoped to message scopes of an intersection or union of message scope types. Intersection and union of message scope types comprise "File in Session" and "File or Session". Scoped messages supported further comprise request and notice messages. Receiver processes supported comprise handler processes and observer processes. Request messages may be observed as well as handled, and notice messages may be handled as well as observed. Handler and observer processes may be non-executing as well as executing. Local receiver processes are selected for session scoped messages. Remote as well as local receiver processes are selected for non-session scoped messages. Sender processes do not need to specify the identity of the receiver processes. The sender process and the receiver processes may be executed within the same or different sessions, on the same computer or on different computers in a network.

20 Claims, 8 Drawing Sheets

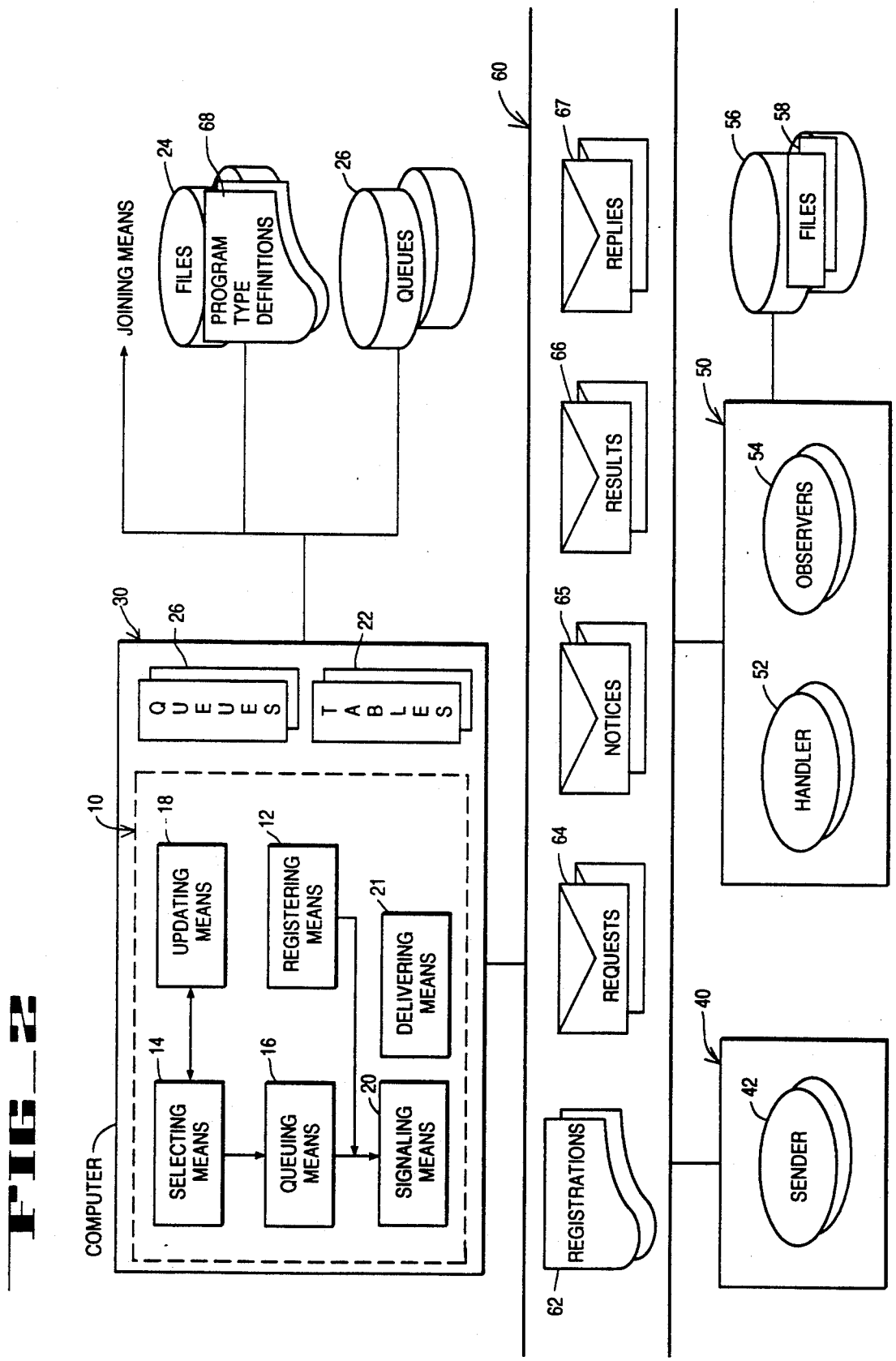

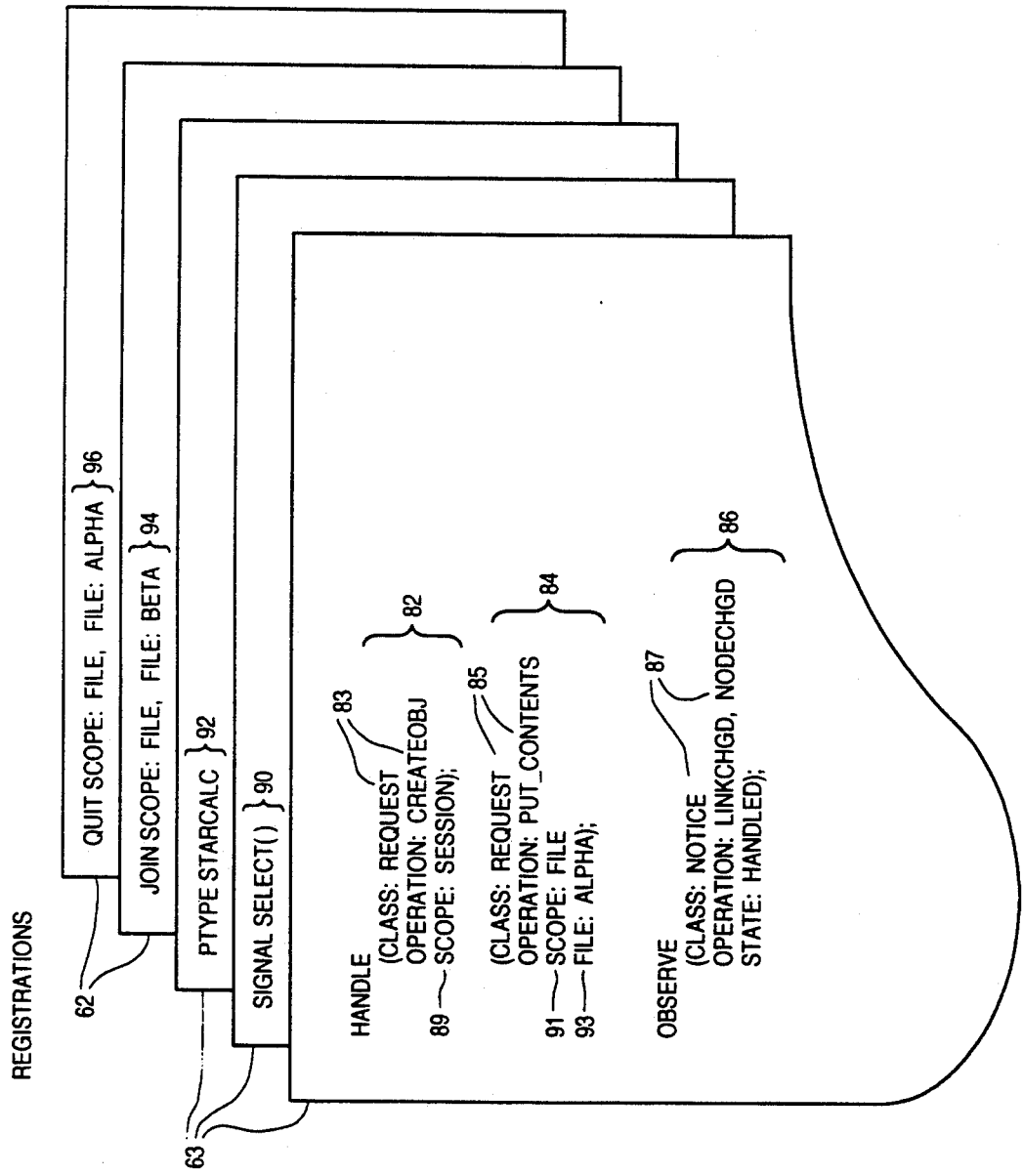

FIG_3B

MESSAGE 64, 65

| Field | Description |
|---|---|
| ID = SENDER ID AND SENDER'S COUNTER | 100 |
| SCOPE = E.G. SESSION, FILE, FILE IN SESSION, FILE OR SESSION | 102 |
| RECIPIENT = BOTH HANDLER & OBSERVERS, HANDLER ONLY, OBSERVER ONLY | 104 |
| DISPATCH LIST = DISPATCH RECORDS (SESSION ID, TIMESTAMP) | 106 |
| SENDER SESSION ID | 108 |
| NON-SESSION SCOPE ID = E.G. FILE ID | 110 |
| CLASS = REQUEST OR NOTICE | 112 |
| STATE = CREATED, SEND, HANDLED, QUEUED, STARTED OR FAILED | 114 |
| OPERATION = ACTION E.G. CREATE AN OBJECT, SAVE AN OBJECT | 116 |
| ARGUMENTS ASSOCIATED WITH OPERATION | 118 |
| SENDER ID | 120 |
| SENDER PROGRAM TYPE ID | 122 |
| HANDLER ID | 124 |
| HANDLER PROGRAM TYPE ID | 126 |
| DISPOSITION = QUEUE, START OR DISCARD | 128 |
| FAILURE REASON | |
| OTHER ATTRIBUTES | 130 |

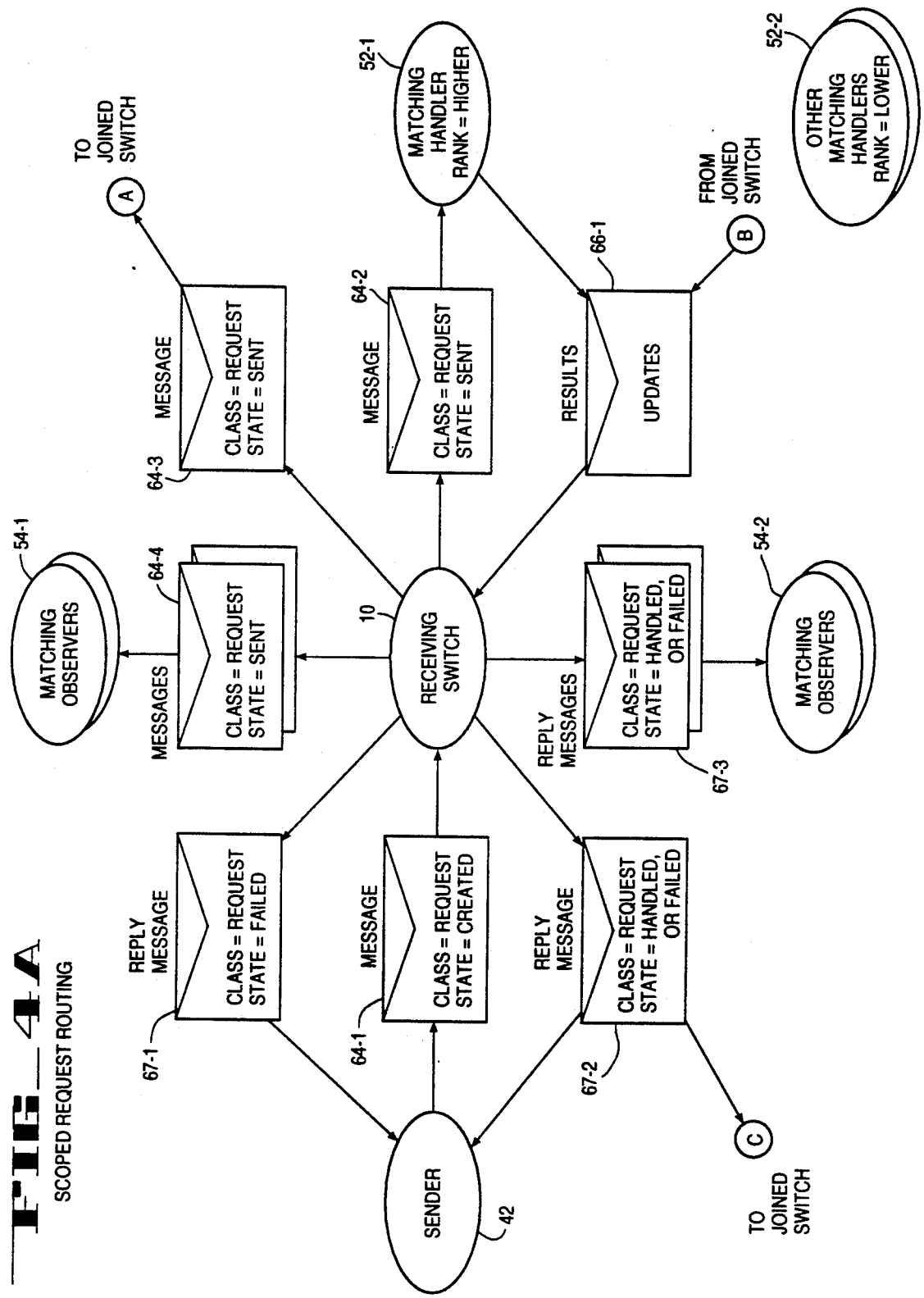

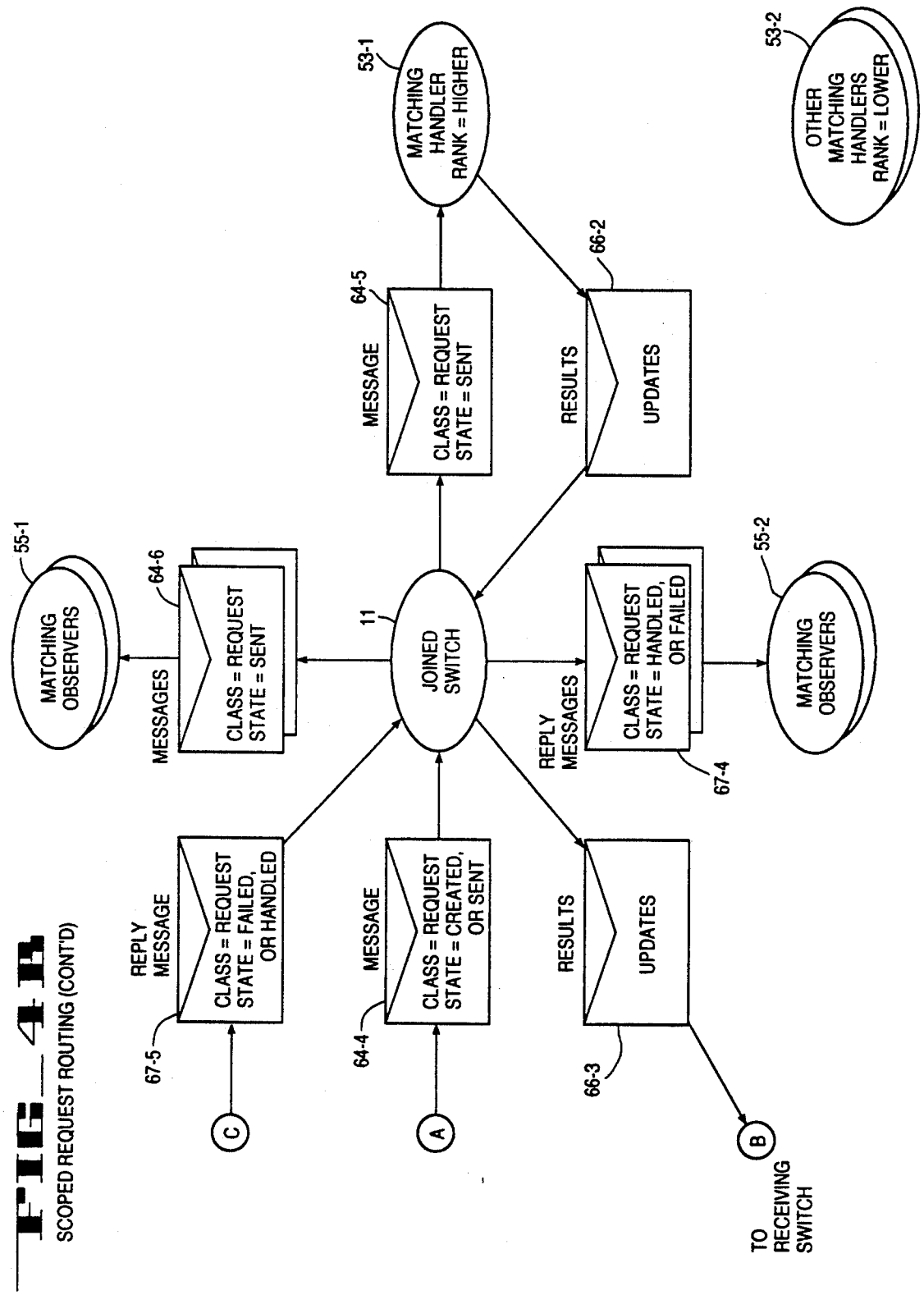

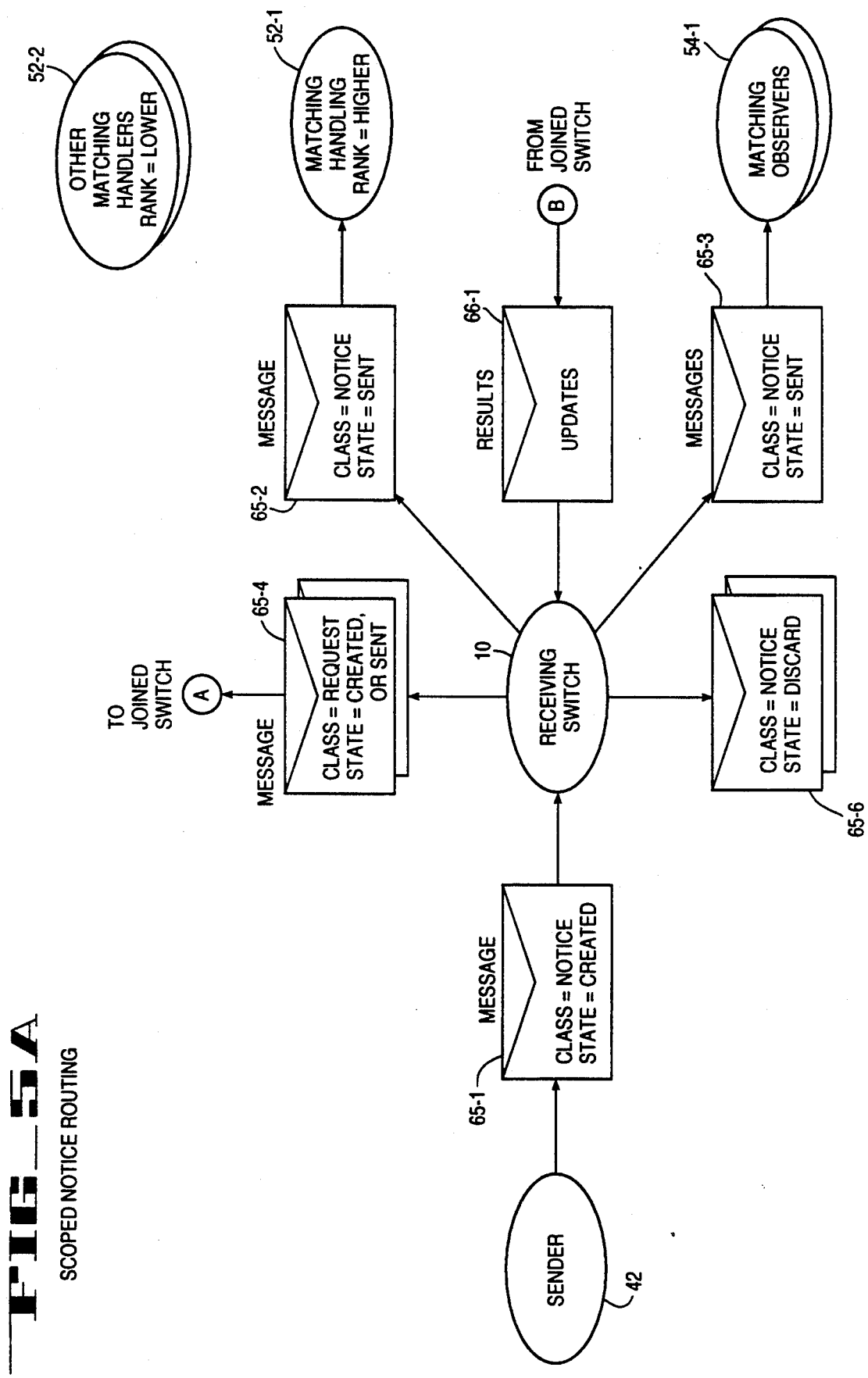

SCOPED NOTICE ROUTING (CONT'D)

METHOD AND APPARATUS FOR SCOPED INTERPROCESS MESSAGE SWITCHING

BACKGROUND OF THE INVENTION

1. Field of the Invention

The present invention relates to the field of computer systems. In particular, the present invention is a method and apparatus for scoped interprocess message switching between a sender process and a plurality of receiver processes.

2. Art Background

Conventional interprocess communication facilities deliver messages in as many as three modes: broadcast to all processes, multicast to a group of processes, or point-to-point to a particular process. Except for broadcast delivery, the other two modes require the sender process to supply the identities of the receiver processes. Absent from conventional facilities is the ability for a sender process to address a scoped message to a set of receiver processes, specifying the name of the set but not the identities of the processes in the set.

A process is a copy or an instance of a program, an executable file, in process of execution. A scoped message is a message having a message scope which defines the set of receiver processes eligible for receiving the scoped message.

In cooperative multiprocess applications, processes executing within the same user session or in different user sessions, sometimes share common files. When one process changes one of the shared files, the other processes sharing the file being changed, whether they are executing within the same user session or in different user sessions, should be informed of the change. For example, a number of displaying processes may be displaying a shared common file for different user sessions, these displaying processes will have to update their displays, if the shared file is changed by one of the processes. To notify all these displaying processes, messages will have to be delivered within a session and across sessions.

Conventional facilities require that the message be broadcast or the identities of these receiver processes be provided. The former is wasteful; the latter is difficult to implement as it requires each process to communicate its changing interest in the sharable files to all other processes, and to track the changing interests of all other processes. In cooperative multiprocess applications, the set of processes within a scope changes as processes are created or destroyed, and as processes work with one file, then another.

As will be described, the present invention overcomes the disadvantages of the prior art, and provides a method and apparatus for scoped interprocess message switching between a sender process and a plurality of receiver processes.

SUMMARY OF THE INVENTION

It is therefore an object of the present invention to improve interprocess message switching between a sender process and a plurality of receiver processes, in particular, to provide switching of scoped messages.

It is another object of the present invention that messages may be scoped to a set of receiver processes, within a session or across sessions.

These objects are realized by the method and apparatus for scoped interprocess message switching between a sender process and a plurality of receiver processes of the present invention. The preferred embodiment of the method comprises the steps of registering the receiver processes with one of a plurality of interprocess message switches, joining message scopes by the switches on behalf of the registered receiver processes, selecting the registered receiver processes by the joined switches to receive scoped messages received from the sender process, queuing copies of the received scoped messages by the selecting switches, for the selected receiver processes, executing or non-executing, signaling the selected receiver processes by the queuing switches regarding the availability of the queued scoped messages, and delivering the queued scoped messages by the signaling switches, when requested by the signaled receiver processes, to the requesting receiver processes. The apparatus comprises various means for accomplishing the steps of registering, joining, selecting, queuing, signaling and delivering.

For disposing the received scoped messages, the preferred embodiment of the method further comprises the steps of registering the sender process with the receiving switch, discarding scoped notice messages with no selected receiver processes by the receiving switch, and replying to scoped request messages by the receiving switch. Likewise, the apparatus further comprises various means for accomplishing the steps of registering, discarding and replying.

For replying to scoped request messages with no selected handler processes, the preferred embodiment of the method further comprises the steps of updating the scoped request messages by the receiving switch with the selection/handling results, selecting the registered observer processes by the joined switches to receive the reply messages, queuing copies of the reply messages by the receiving switch for the sender process, and by the selecting switches for the selected observer processes, executing and non-executing, signaling the sender process and the executing selected observer processes by the queuing switches regarding the availability of the queued reply messages, and delivering the queued reply messages by the signaling switches, when requested by the signaled processes, to the requesting processes. Similarly, the apparatus further comprises various means for accomplishing the steps of updating, selecting, queuing, signaling and delivering.

For replying to scoped request messages with selected handler processes, the preferred embodiment of the method further comprises the steps of queuing an additional copy of each of the scoped request messages by the receiving switch, pending results from the local handler processes or the handler selecting joined switches, and dequeuing the result pending scoped request messages by the receiving switch, upon receipt of the results, prior to the steps of updating, selecting, signaling, and delivering described above. Similarly, the apparatus further comprises various means for accomplishing the steps of queuing and dequeuing.

Registration of the receiver processes comprises registering message patterns, signaling ways and program type identifiers. Registration of the sender process comprises registering signaling ways. Receiver and sender processes may register dynamically at their initializations or some later points during their execution.

Joining message scopes by switches on behalf of the receiver processes comprises joining a plurality of message scopes of various message scope types. Message scope types comprise "Session", "File", "File in Session" and "File or Session". Message scopes comprise a particular session, a particular file, and intersection between a particular session and one or more particular files, and a union of a particular session and one or more particular files.

Scoped messages comprise a plurality of message attributes describing the messages. Message attributes comprise a message identifier, a message scope type, a message sender session identifier, a message non-session scope identifier, and a message recipient. Message attributes further comprise a message class and a message state. Message classes comprise "Request" and "Notice". Message states comprise "Created", "Sent", "Handled", "Queued", "Started" and "Failed".

Selection comprises selecting at most one handler process and any number of observer processes for each scoped message. Both handler processes and observer processes are selected regardless of message class. Both executing as well as non-executing processes (i.e. programs) are selected. Only local receiver processes are selected for session scoped messages. Remote as well as local receiver processes are selected for non-session scoped messages. Processes are selected by matching message attributes. Matchings are performed against the registered message patterns and the message patterns within message signatures contained in program type definitions.

BRIEF DESCRIPTION OF THE DRAWINGS

FIG. 2 is a block diagram illustrating one of the joined interprocess message switches comprising a registering means, a selecting means, a queuing means, a signaling means, a delivering means and an updating means.

FIGS. 3a and 3b illustrate exemplary registrations for message patterns, signaling ways and program type identifiers, and exemplary message attributes for describing messages, used by the apparatus of the present invention.

FIGS. 4a and 4b illustrate the routing of a scoped request message in the preferred embodiment of the present invention FIGS. 5a and 5b illustrate the routing of a scoped notice message in the preferred embodiment of the present invention

NOTATIONS AND NOMENCLATURE

Figure 1:
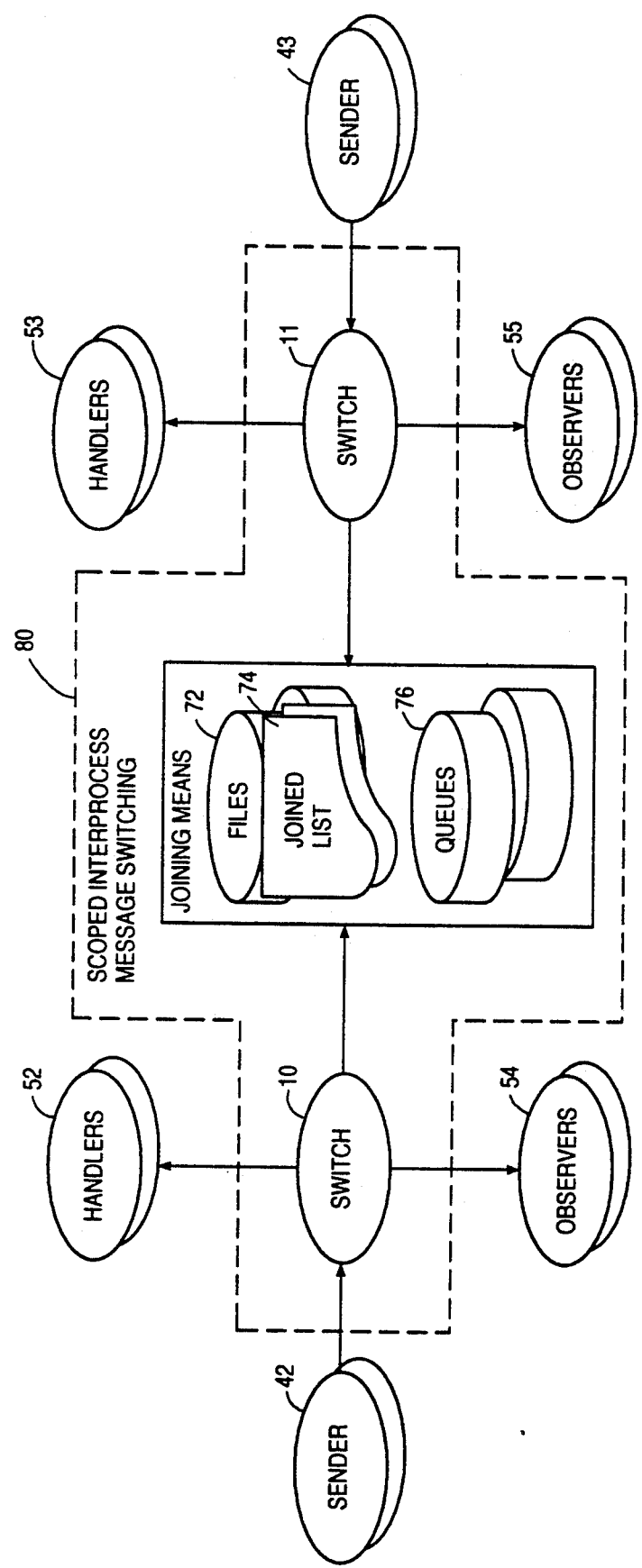
FIG. 1 is a block diagram illustrating the apparatus of the present invention for scoped interprocess message switching between a sender process and a plurality of receiver processes, comprising a joining means and a plurality of interprocess message switches.

The detailed description which follows is presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The algorithms presented herein are not entirely related to any particular computer or other apparatus. In particular, various general purpose machines may be used with programs written in accordance with the teaching herein, or it may prove more convenient to construct more specialized apparatus to perform the required method steps. The required structure for a variety of these machines will appear from the description given below.

Glossary

A process is an instance of execution of a program.

A session is a collection of processes executing on behalf of a user.

A local process is a process within a user's session.

A remote process is a process outside a user's session, in another user's session.

A switch is a message routing process.

A local switch is a switch within a user's session.

A remote switch is a switch outside a user's session, in another user's session.

A message scope specifies the reach, or the range, or the confine of the message, e.g. "Session", "File in Session", or "File or session".

A scoped message is a message with its scope specified.

Joining a switch to a non-session message scope is enrolling the switch as one of remote switch for messages of the particular non-session message scope.

A session scoped message is a scoped message whose reach, range, or confine is limited to a session.

A non-session scoped message is a scoped message whose reach, range, or confine is not limited to a session.

Detailed Description of the Invention

A method and apparatus for scoped interprocess message switching having particular application for switching scoped messages between a sender process and a plurality of receiver processes being executed in the same or different sessions, on the same or different computers in a network, is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

1. Overview

Referring now to FIG. 1, a block diagram illustrating the preferred embodiment of the apparatus for scoped interprocess message switching of the present invention 80 is shown. The apparatus 80 serves a plurality of sender processes 42, 43 sending scoped messages (not shown) to, and getting reply messages (not shown) from a plurality of receiver processes 52–55.

The apparatus 80 comprises a joining means 70, and a plurality of identical interprocess message switches 10, 11 (two shown) coupled to the joining means 70. Each switch 10 directly serves a local user session comprising the switch 10, a plurality of local sender processes 42 and a plurality of local receiver processes 52, 54. Each switch 10 indirectly serves remote user sessions through remote joined switches 11 within the remote user sessions. Similarly, a remote user session comprises the remote joined switch 11, a plurality of remote sender processes 43 and a plurality of remote receiver processes 53, 55. Processes are local to the switches within their sessions (one switch per session) and remote to the other switches within other sessions.

2. Joining Means

Continuing referring to FIG. 1, the joining means 70 is used by the interprocess message switches 10, 11 to join one or more non-session message scopes on behalf of locally registered receiver processes. Each of the switches 10, 11 joins a non-session message scope when one of its locally registered receiver processes 52–55 registers a message pattern with the particular non-session message scope. Each of the switches, 10, 11 quits a non-session message scope when all of its locally registered receiver processes 52–55 have unregistered message patterns with the particular non-session message scope. Message scopes and registering of receiver processes will be discussed in further details later.

The joining means 70 comprises at least one joined list 74, and at least one shared messages queues 76. Each of the joined lists 76 comprises a plurality of joined records. Each joined record comprises a session identifier and a timestamp. The session identifier identifies the joining switch 10, 11, and the timestamp identifies the time the switch 10, 11 most recently joins the particular message scope. The joining switches 10, 11 join a message scope by creating a joined record in the joined list 76 for the particular message scope.

Preferably, a plurality of joined lists 74 organized on a per message scope type basis is used. Additionally, each of the joined lists 74 further comprises joined sub-lists organized on a per message scope basis. Similarly, a plurality of shared program pending message queues 76 organized on a per message scope type basis is used. Each of the shared program pending message queues 76 further comprise sub-queues organized on a per message scope basis.

3. Interprocess Message Switch

Referring now to FIG. 2, a block diagram illustrating one of the identical interprocess message switches 10 is shown. The switch 10 is shown in the context of its user session comprising the switch 10, a plurality of local sender processes 42 and a plurality of local receiver processes 52, 54. The local processes 42, 52, 54 are executing on a plurality of computers 30, 40, 50 connected to a network 60. These computers 30, 40, 50 and other computers (not shown) connected to the network 60 further comprise other remote user sessions. Each of these remote user sessions comprises a remote switch (not shown), a plurality of remote sender/receiver processes (not shown).

The local sender processes 42 send scoped messages 64, 65 to and get reply messages 67 from, the local receiver processes 52, 54 and the remote receiver processes. The scoped messages 64, 65 comprise scoped request messages 64, and scoped notice messages 65. Local receiver processes comprise local handler processes 52 and local observer processes 54. Similarly, remote receiver processes comprise remote handler processes and remote observer processes.

The switch 10 comprises a registering means 12 comprising an interface (not shown) for receiving registrations 62 as inputs from the local processes 42, 52, 54, a selecting means 14 coupled to the updating means 18 and comprising an interface (not shown) for receiving scoped messages 64, 65 as inputs from the local sender processes 42, a queuing means 16 coupled to the selecting means 14, an updating means 18 coupled to the selecting means 14 and comprising an interface (not shown) for receiving results 66 as inputs from the local receiver processes 52, 54 and the remote switches, a signaling means 20 coupled to the registering means 12 and the queuing means 16 for outputting signals to the processes 42, 52, 54, and a delivering means 21 comprising an interface (not shown) for receiving acknowledgements from the local processes 42, 52, 54 as inputs and outputing scoped messages 64, 65 to the local receiver processes 52, 54 and reply messages 67 to the local sender processes 42.

a. Registering Means

Continuing referring to FIG. 2, the registering means 12 is for registering local receiver processes 52, 54 with the switch 10. Receiver processes are registered with one switch, their local switch. Registration of local receiver processes 52, 54 comprises registering at least one signaling way and at least one message pattern for each of the local receiver processes 52, 54. Additionally, registration of local receiver processes may further comprise registering a program type identifier for each of the local receiver processes 52, 54.

The signaling ways describe to the switch 10, how the registering local receiver processes 52, 54 is to be signaled regarding the availability of a scoped message 64, 65. The message patterns describe to the switch 10, the scoped messages 64, 65 which the registering local receiver process 52, 54 is to receive. The program type identifier describes to the switch 10 the program type of the program being executed by the registering local receiver process 52, 54.

The registering local processes 52, 54 may register dynamically during their initialization or at some later point during their execution. The registering local processes 52, 54 may add registrations 62 or delete prior registrations 62. The adding and deleting may be adding and deleting of subsets of registrations 62.

For further information on the registering means, registrations comprising message patterns, signaling ways, and program type identifiers, see the Specification in co-pending U.S. patent application, Ser. No. 07/627,735, filed on Dec. 14, 1990, assigned to the assignee of the present Application, Sun Microsystems Inc., entitled A method and Apparatus for Interprocess Message Switching, which is hereby fully incorporated by reference.

Referring now to FIG. 3a, a local receiver process registers its interest in handling or observing messages pertaining to a particular message scope by registering message patterns 82, 84 comprising message scope type attributes 89, 91 equaling the message scope type of the particular message scope. Additionally, for non-session message scope types 91, the message patterns 84 may further comprise message non-session scope identifiers equaling the particular message scope. As described in the incorporated Specification, upon receipt of these registrations, the registering means extracts the message patterns and stores them in tables for subsequent use by the selecting means.

Preferably, message patterns with message scope types scoped to intersections or unions of session message scope type with one or more non-session message scope types may also be registered. It will be understood that the intersection of session message scope type with one or more non-session message scope types is a session message scope type, whereas, the union of session message scope type with one more non-session message scope types is a non-session message scope type. Message scope types and message scopes will be discussed in further details in conjunction with message attributes.

Additionally, a registered local receiver process may also widen or narrow its interest in handling or observing messages pertaining to individual non-session message scopes, by adding to 94 or deleting from 96 the content of the non-session message scope identifier attributes 93 in the registered message patterns. As described in the incorporated Specification, upon receipt of these registrations, the registering means adds to or deletes from the content of the non-session message scope identifier attributes in the stored message patterns scoped to the particular non-session message scope types. Additionally, the registering means also adds to or deletes from the content of the non-session, message scope identifier attributes in the stored message patterns scoped to the intersections or unions with the particular non-session message scope types.

An exemplary registration containing a plurality of message patterns scoped to different message scopes is shown in the first exemplary registration 62 in FIG. 3a. The first exemplary registration 62 comprises two handle message patterns 82, 84 scoped to different message scope types, and an observe message pattern 86 not scoped to any particular message scope type.

The first exemplary handle message pattern 82 contains a plurality of message attributes 83 describing to the switch that the registering local receiver process is to receive messages 64 with a message class attribute of "Request", a message operation attribute of "Create Obj", representing the action of creating an object, and a message scope type attribute of "Session".

The second exemplary handle message pattern 84 contains a plurality of message attributes 85 describing to the switch that, the registering local receiver process is to receive messages 64 with a message class attribute of "Request", a message operation attribute of "Put_Contents", representing the action of writing out to an object, a message scope type attribute of "File", and a message non-session scope identifier attribute of "Alpha", representing the identifier of a particular file.

The exemplary observe message pattern 86 contains a plurality of message attributes 87 describing to the switch, that the registering local process is to receive messages 65 with a message class of "Notice", a message operation attribute of "LinkChgd, NodeChgd", representing the occurrence of the events of a link change or a node change, and a message state attribute of "Handled", regardless of the message scope type (none specified).

Two exemplary registrations containing addition to and deletion from message patterns scoped to a particular message scope type are also shown in the fourth and fifth exemplary registration 62 in FIG. 3a. The fourth exemplary registration 62 comprises an addition 94, describing to the switch that, the file identifier of "Beta" is to be added to all message non-session scope identifier attributes in registered message patterns scoped to the message scope types "File", "File in Session" and "File or Session". "File in Session"$\pi$is the intersection of the message scope type "File" and the message scope type "Session", and "File or Session" is the union of these message scope types. The fifth exemplary registration 62 comprises a deletion 96, describing to the switch that the file identifier of "Alpha" is to be deleted from all message non-session scope identifier attributes in registered message patterns scoped to the message scope types "File", "File in Session" and "File or Session".

Additionally, when a local receiver process registers a program type identifier 92, the registering means also checks the shared program pending messages queues in the joining means previously described, to determine if there are messages pending for a process executing a program of the particular program type being registered. In the registration illustrated, the switch will check for messages pending for a process executing the program "Starcalc".

b. Selecting Means

Referring to FIG. 2 again, the selecting means 14 of a receiving switch 10 is for selecting local receiver processes 52, 54 and remote receiver processes (through the joined switches) to receive scoped messages 64, 65 received from the local sender processes 42. Selection of receiver processes comprises selecting at most one local handler process 52, and any number of local observer processes 54 for each session scoped message 64, 65. Selection of receiver processes further comprises selecting at most one local 52 or remote handler process, and any number of local 54 and remote observer processes for each non-session scoped message 64, 65. Handler processes are selected for scoped notice messages 65 as well as for scoped request messages 64. Likewise, observer processes are selected for scoped request messages 64 as well as for scoped notice messages 65. Non-executing receiver processes (i.e. programs) are selected as well as executing receiver processes.

For further information on the selecting means, and the selection of local handler and observer processes, executing and non-executing, also see the incorporated Specification in co-pending U.S. patent application, Ser. No. 07/627,735, filed on Dec. 14, 1990, assigned to the assignee of the present Application, Sun Microsystems Inc., entitled A Method and Apparatus for Interprocess Message Switching.

For session scoped messages 64, 65, no additional action beyond what are described in the incorporated Specification is taken by the selecting means 14 of the receiving switch 10. As a result, only local receiver processes 52, 54 are selected.

For non-session scoped messages 64, 65, the selecting means 14 of the receiving switch 10 further selects joined switches and sends copies of the non-session scoped messages 64, 65 to the selected joined switches for selection of remote observer processes and remote handler processes. The selecting means 14 of the receiving switch 10 selects the joined switches for selection of remote observer processes regardless whether local receiver processes 52, 54 are selected. The selecting means 14 of the receiving switch 10 selects the joined switches for selection of remote handler processes, only if local handler processes 52 are not selected.

For selection of remote observer processes, the selecting means 14 of the receiving switch 10 selects, for each of the non-session scoped messages 64, 65, all joined switches that have not been sent a copy of the non-session scoped message 64, 65. The selecting means 14 of the receiving switch 10 further comprises a checking means (not shown) coupled to the third matching means (see incorporated Specification) for determining whether a joined switch has been sent a copy of a non-session scoped message 64, 65 by comparing the content of a message dispatched list attribute of a non-session scoped message 64, 65 against the joined records in the joined lists for the particular non-session message scope. If one or more joined switches are selected for a non-session scoped message 64, 65, the checking means of the selecting means 14 of the receiving switch 10 updates a message recipient attribute in the non-session scoped messages 64, 65 to "Observers Only", and the message dispatched list attribute with the session identifiers of the selected joined switches, and sends a copy of the updated non-session scoped message 64, 65 to each of the selected joined switches. The message recipient attribute and the message dispatched list attribute of a scoped message 64, 65 will be discussed in further details in conjunction with other message attributes later.

For selection of remote handler processes, the selecting means 14 of the receiving switch 10 selects, for each of the non-session scoped messages 64, 65 with no local handler processes, one of the joined switches that have not been sent a copy of the non-session scoped message 64, 65. The selecting means 14 of the receiving switch 10 determines whether a joined switch has been sent a copy of a non-session scoped message 64, 65 in the same manner as described above. The checking means of the selecting means 14 of the receiving switch 10 selects one of these joined switches arbitrarily. If a joined switch is selected for a non-session scoped message 64, 65, the selecting means 14 of the receiving switch 10 updates the message recipient attribute in the non-session scoped messages 64, 65 to "Handler Only", message handler program type attributes with matching handler program types from message signature matchings and the message dispatched list attribute with the selected joined switch's session identifier, and sends a copy of the updated non-session scoped message 64, 65 to the selected joined switch.

The selecting means 14 of the receiving switch 10 repeats this process until a remote handler process is selected or all the joined switches have been selected. The selecting means 14 of the receiving switch 10 being coupled to the updating means 18 receives the scoped messages 64, 65 as input again, when no remote handler processes are selected by the selected joined switches. The selecting means 14 of the receiving switch 10 may determine whether the scoped messages 64, 65 are received from the sender processes 42 or the updating means 18 in a variety of manners, including but not limited to the message state attributes. The message state attribute and the updating means 18 will be discussed in further details later in conjunction with message attributes and reply messages respectively.

The non-session scoped messages 64, 65 may be sent from the receiving switch 10 to the selected joined switches using any system message sending services. Preferably, the same system message sending services used by the registering means 12, as described in the incorporated Specification, is used.

Selection of remote receiver processes by the selecting means of a joined switch comprises the same steps of matching, choosing, and starting for selection of local receiver processes 52, performed by the selecting means 14 of the receiving switch 10. The selecting means of a joined switch do not select joined switches. Furthermore, if the program type definitions 68 are stored in files 24 shared among the joined switches, the selecting means of a joined switch may skip the step of message signatures matching. The selecting means of a joined switch may determine whether the scoped messages 64, 65 are received from the receiving switch 10 or its local sender processes in a variety of manners, including but not limited to the message state attribute and the message recipient attribute.

The routing of session and non-session scoped request and notices messages 64, 65 to local and remote handler and observer processes will be discussed in further details later.

c. Queuing Means

Referring to FIG. 2 again, the queuing means 16 of the receiving switch 10 is for queuing copies of the scoped messages 64, 65 with selected local receiver processes 52, 54. The queuing means 16 of the receiving switch 10 being coupled to the selecting means 14 receives the scoped messages 64, 65 and local selection results from the selecting means 14 as input. The queuing means 16 of the receiving switch 10 queues copies of the scoped messages 64, 65 with executing selected local receiver processes 52, 54 for subsequent retrieval by these local processes. The queuing means 16 of the receiving switch 10 also queues copies of the scoped messages 64, 65 with non-executing selected receiver processes (i.e. programs), if the message disposition attributes are "queue".

The queuing means 16 of the receiving switch 10 queues copies of the program pending session scoped messages 64, 65 into one of a plurality of private program pending messages queues 26. The queuing means 16 of the receiving switch 10 queues copies of the program pending non-session scoped messages 64, 65 into one of the shared program pending messages queues in the joining means (see FIG. 1), for the particular non-session message scopes.

Similarly, the queuing means of a joined switch is for queuing copies of the scoped messages 64, 65 with selected remote receiver processes (local to the joined switch). The queuing means of a joined switch receives the scoped messages 64, 65 as input and queues copies of them in the same manner as the queuing means 16 of the receiving switch 10.

For further information on the queuing means and the private program pending messages queues, also see the incorporated Specification in co-pending U.S. patent application Ser. No. 07/627,735, filed on Dec. 14, 1990, assigned to the assignee of present Application, Sun Microsystems Inc., entitled A Method and Apparatus for Interprocess Message Switching.

d. Signaling and Delivering Means

Continuing referring to FIG. 2, the signaling means 20 of the receiving switch 10 is for signaling the selected local receiver processes 52, 54 regarding the availability of a scoped message 64, 65. The signaling means 20 of the receiving switch 10 being coupled to the queuing means 16 of the receiving switch 10, receives the selected executing local receiver process identifiers from the queuing means 16 of the receiving switch 10, as input. The signaling means 20 of the receiving switch 10 being also coupled to the registering means 12 of the receiving switch 10 receives receiver processes identifiers of registering local receiver processes with program types that are matching against pending programs, from the registering means 12 of the receiving switch 10, as input. The signaling means 20 of the receiving switch 10 signals these executing local receiver processes 52, 54 regarding the availability of the queued scoped messages 64, 65. It will be understood that local receiver processes 52, 54 being started by the receiving switch 10 do not have to be signaled. The starting local receiver processes 52, 54 are "signaled" as part of the start up process.

Similarly, the signaling means of a joined switch is for signaling the selected remote receiver processes (local to the joined switch). The signaling means of a joined switch receives the remote receiver processes identifiers (local to the joined switch) and signals them in the same manner as the signaling means 20 of the receiving switch 10.

The delivering means 21 of the receiving switch 10 is for dequeuing the queued scoped messages 64, 65 and delivering the scoped messages 64, 65 to the selected local receiver processes 52, 54. The delivering means 21 of the receiving switch 21 comprises an interface (not shown) for receiving acknowledgements from the local receiver processes 52, 54 as inputs, indicating that the local receiver processes 52, 54 are ready to receive the queued scoped messages 64, 65. Upon receipt of the acknowledgements, the delivering means 21 of the receiving switch 10 dequeues the queued scoped messages 64, 65 and delivers the scoped messages 64, 65 to the acknowledging local receiver processes 52, 54.

Similarly, the delivering means of a joined switch is for dequeuing and delivering the queued scoped messages 64, 65 to selected remote receiver processes. The delivering means of a joined switch receives acknowledgement from the signaled remote receiver processes (local to the joined switch), dequeues and delivers the scoped messages 64, 65 in the same manner as the delivering means 21 of the receiving switch 10.

For further information on the signaling means, and the delivering means, also see the incorporated Specification in co-pending U.S. patent application, Ser. No. 07/627,735, filed on Sep. 14, 1990, assigned to the assignee of present Application, Sun Microsystems Inc., entitled A Method and Apparatus for Interprocess Message Switching.

4. Message Attributes

Referring now to FIG. 3b, a block diagram illustrating exemplary message attributes used by the apparatus of the present invention for describing the scoped messages 64, 65 is shown. Each scoped message 64, 65 comprises at least one message attribute 100-130. The message attributes 100-130 comprise a message identifier 100, a message scope type attribute 102, a message recipient attribute 104, a message dispatch list attribute 106, a message sender session identifier attribute 108, a message non-session scope identifier attribute 110. Preferably, the message attributes 112-130 further comprise a message class attribute 112, a message state attribute 114, a message operation attribute 116, a message operation argument attribute 118, message sender identifier 120, a message sender program type identifier 122, a message handler identifier 124, a message handler program type identifier 126, a message disposition attribute 128, and a message failure reason attribute 130.

The message identifier 100 uniquely identifies the scoped message 64, 65. The unique message identifier 100 may be constructed in a variety of manners. Preferably, the unique message identifier 100 comprises a sender computer identifier, a sender process identifier and a sender process specific message identifier, such as a message counter, for example, Sextant.712.0001.

The message scope type attribute 102 describes the message scope type of the scoped message 64, 65. Message scope types may be "Session" or one of a plurality of non-session message scope types. Non-session message scope types comprise a message scope type of "File". The message scope type of "Session" is the defaulted message scope type, if no message scope type is specified. A "Session" message scope type describes to the switch that only local receiver processes registered with the receiving switch are to be selected. A non-session message scope type describes to the receiving switch that remote receiver processes are to be selected as well as local receiver processes.

Preferably, message scope types may further comprise intersections and unions of message scope types comprising an intersection message scope type of "File in Session", and a union message scope type of "File or Session". As discussed earlier, the intersection of a non-session message scope with the "Session" message scope is a session message scope, therefore, only local receiver processes are selected for the message scope type of "File in Session"; whereas, the union of a non-session message scope with the "Session" message scope is a non-session message scope, therefore remote as well as local receiver processes are selected for the message scope type of "File or Session".

The message recipient attribute 104 describes to the selecting switch, what type of receiver processes are to be selected. The message recipient attribute 104 comprises one of a plurality of recipient specifications. Recipient specifications comprise "Both Handler and Observers", "Handler Only" and "Observers Only". The recipient specification of "Both Handler and Observers" is the defaulted recipient specification, if none specified.

The message dispatched list attribute 106 describes to the selecting switch, which joined switch has been sent the scoped message 64, 65 and the time at which the scoped message 64, 65 was sent. The message dispatched list attribute 104 comprises a plurality of dispatched records comprising a session identifier and a timestamp. The session identifier identifies the joined switch that has been sent the scoped message 64, 65. The timestamp marks the time the scoped message 64, 65 was sent.

The message sender session identifier attribute 108 describes to the selecting switch, which session (i.e. which joined switch) the sender process is affiliated with. The session identifier may be implemented in a wide variety of manners, as long as it uniquely identifies the joined switch.

The message non-session scope identifier 110 describes to the selecting switch, the particular non-session message scope that the scoped message 64, 65 is scoped to, e.g. a file identifier. Likewise, the message non-session scope identifier may be implemented in a wide variety of manners, as long as it uniquely identifies the non-session message scope.

For further information on other message attributes 112-130, also see the incorporated Specification in co-pending U.S. patent application Ser. No. 07/627,735, filed on Dec. 14, 1990, assigned to the assignee of the present Application, Sun Microsystems Inc., entitled A Method and Apparatus for Interprocess Message Switching.

5. Replies

Referring back to FIG. 2, the interprocess message switch 10 also provides specific supports for providing reply messages 67 to the scoped request messages 64. Reply messages 67 are generated by the receiving switch 10 for the local sender processes 42 for scoped request messages 64. No reply messages 67 are generated by the receiving switch 10 for the local sender processes 42 for scoped notice messages 65. Additionally, the supports for providing reply messages 67 are also used by the receiving switch 10 and the joined switches to facilitate selection for remote handler processes for scoped notice messages 65 as well as scoped request messages 64.

Additional specific supports for the reply messages 67 are provided by the updating means 18 and the queuing means 16. The registering means 12, the selecting means 14, the signaling means 20, and the delivering means 21 are also used, but no additional supports beyond what has been described are required in these means.

a, Updating Means

The updating means 18 of a receiving switch 10 is for generating reply messages 67 to scoped request messages 64 for the local sender processes 42. The updating means 18 of a receiving switch 10 is also for causing the selecting means 14 of a receiving switch 10 to select another joined switch.

The updating means 18 of the receiving switch 10 being coupled to the selecting means 14 of the receiving switch 10 receives results of local handler processes selection from the selecting means 14 of the receiving switch 10, as input. The updating means 18 of the receiving switch 10 further comprises an interface (not shown) for receiving results 66 of remote handler processes selection from joined switches as input. The updating means 18 of the receiving switch 10 further receives through the same interface, handling results 66 from local handler processes 52 and remote handler selecting switches. Handling results 66 comprise updates of "Handled" or "Failed" to message state attributes and updates to message failure reason attributes. Message state attributes and message failure reason attributes will be discussed in further details later in conjunction with message attributes.

Upon receipt of local selection results from the selecting means 14 of the receiving switch 10, indicating failure to select local handler processes 52 and joined switches (if applicable), the updating means 18 of the receiving switch 10 generates reply messages 67 to scoped request messages 64 and discards scoped notice messages 65. The updating means 18 of the receiving switch 10 generates the reply messages 67 by updating the scoped request messages 64. Updates comprise updating message state attributes to "Failed", and message failure reason attributes. Upon receipt of local selection results from the selecting means 14, indicating success in selecting local handler processes 52 or joined switches (if applicable), the updating means 18 of the receiving switch 10 takes no action.

Upon receipt of the remote selection results (always equal "Failed") from a joined switch, the updating means 18 of the receiving switch 10 dequeues the results pending scoped messages 64, 65 from the results pending messages queues 26, and outputs the dequeued scoped messages 64, 65 to the selecting means 14 of the receiving switch 10. As discussed earlier, the selecting means 14 of the receiving switch 10 being coupled to the updating means 18 of the receiving switch 10 receives the dequeued scoped message 64, 65 as input for selection of the "next" joined switch. Remote selection results will be discussed in further details later in conjunction with the updating means of a joined switch. Queuing of the scoped messages 64, 65 into results pending messages queues will be discussed in further details later in conjunction with the specific supports provided for the reply messages 67 by the queuing means 16 of the receiving switch 10.

Upon receipt of handling results 66 for scoped request messages 64 from local handler processes or remote handler selecting switches, the updating means 18 of the receiving switch 10 generates the reply messages 67. The updating means 18 of the receiving switch 10 dequeues the results pending scoped request messages from results pending messages queues 26 and generates the reply messages 67 by updating the scoped request messages 64 according to the handling results 66 received.

The updating means of a joined switch is used for providing remote selection and handling results 66 for scoped request and notice messages 64, 65 to the receiving switch 10. The updating means of a joined switch being coupled to the selecting means of the joined switch receives results of remote handler processes selection (local to the joined switch) from the selecting means of the joined switch, as input. The updating means of a joined switch further comprise an interface (not shown) for receiving remote handling results from remote handler processes (local to the joined switch).

Upon receipt of selection results from the selecting means of a joined switch, indicating failure to select local handler processes (remote to the receiving switch 10), the updating means of the joined switch sends the selection results 66 for the scoped messages 64, 65 to the receiving switch 10. Upon receipt of selection results from the selecting means of a joined switch, indicating success in selecting local handler processes (remote to the receiving switch 10), the updating means of the joined switch generates handling results to the scoped notice messages 65 and sends the handling results 66 to the receiving switch 10; no action is taken for scoped request messages 64.

Upon receipt of local handling results from local handler processes of a joined switch (remote to the receiving switch 10), the updating means of the joined switch dequeues the results pending scoped request messages 64 from results pending messages queues, generates the remote handling results 66 based on the local handling results received and sends the remote handling results 66 to the receiving switch 10.

Similar to the selecting means, the updating means may determine whether the switch is a receiving switch 10 or a joined switch in a variety of manners, including but not limited to the message state and recipient attributes.

b. Other Means

Continuing referring to FIG. 2, to support replying to the scoped request messages 64, the registering means 12 is also for registering the local sender process 42 with the receiving switch 10. Similar to the local receiver processes 52, 54, a local sender process is registered with one switch. Registration of local sender processes 42 comprises registering at least one signaling way for each of the local sender processes 42.

Additionally, the queuing means 16 of the receiving switch 10 queues additional copies of the scoped messages 64, 65 sent to the joined switches for selection of remote handler processes, pending receipt of results 66 from the joined switches. The queuing means 16 of a handler selecting receiving switch 10 also queues additional copies of the scoped request messages 64 with selected local handler processes 52, pending receipt of results 66 from the local handler processes 52. Similarly, the queuing means of a handler selecting joined switch queues additional copies of the scoped request messages 64 with selected local handler processes (remote to the receiving switch 10) in the same manner as the receiving switch 10.

The selecting means 14 of the receiving switch 10 is also for selecting any number of local observer processes 54 and joined switches (if applicable) to receive copies of the reply messages 67 generated by the receiving switch 10 for the local sender processes 42. Similarly, the selecting means of a joined switch is for selecting remote observer processes (local to the joined switch) to receive copies of the reply messages 67. Selection of local and remote observer processes for reply messages 67 comprises the same steps for selecting local and remote observer processes for the original scoped messages 64, 65. As discussed earlier, reply messages 67 are generated by updating the scoped request messages 64, therefore, reply messages 67 are scoped to the same message scope types and message scopes, as the original scoped request messages 64. Thus, reply messages 67 to non-session scoped request messages 64 are also forwarded to other joined switches for selection of remote receiver processes.

The queuing means 16 of the receiving switch 10 is also for queuing copies of the reply messages 67 for the original local sender processes 42 and selected local observer processes 54. Similarly, the queuing means of a joined switch is also for queuing copies of the reply messages 67 for selected remote observer processes (local to the joined switch). The signaling means 20 of the receiving switch 10 is also for signaling the original local sender processes 42, and the selected executing local observer processes 54 regarding the availability of the queued reply messages 67. Likewise, the signaling means of a joined switch is for signaling the selected executing remote observer processes (local to the joined switch). The delivering means 21 of the receiving switch 10 is also for dequeuing and delivering the queued reply messages 67 upon request of the signaled local processes 42, 54, to the requesting local processes 42, 54. Similarly, the delivering means of a joined switch is also for dequeuing and delivering the queued reply messages 67 upon request of the signaled remote processes (local to the joined switch), to the requesting remote processes (local to the joined switch).

For further information on replying to request messages, also see the incorporated Specifications in co-pending U.S. patent application, Ser. No. 07/627,735, filed on Dec. 14, 1990, assigned to the assignee of the present Application, Sun Microsystems Inc., entitled A Method and Apparatus for Interprocess Message Switching.

6. Scoped Request Message Routing

Referring now to FIGS. 4a and 4b, two block diagrams summarizing the routing and disposition of a scoped request message are shown. The scoped request messages 64-1 to 64-6, the results 66-1 to 66-3, and the reply messages 67-1 to 67-5, relate to the scoped request messages 64, the results 66 and the reply messages 67 of FIG. 2. Likewise, the handler processes 52-1, 52-2, 53-1, 53-2 and the observer processes 54-1, 54-2, 55-1, 55-2 relate to the handler processes 52, 53 and the observer processes 54, 55 of FIG. 1.

a. Receiving Switch

Referring first to FIG. 4a, initially, the scoped request message with a message state attribute of "Created" 64-1 is sent to the receiving switch 10 as input. Copies of the scoped request message with the message state attribute changed to "Sent" 64-4 are eventually routed to all selected local observer processes 54-1. If the scoped request message is scoped to a non-session message scope, copies of the scoped request message 64-3 with the message state attribute changed to "Sent", and message recipient attribute changed to "Observers Only" are also sent to the all joined switches that have not been sent the non-session scoped request message, for continued selection and routing to remote observer processes.

If local handler processes 52-1, 52-2 are found, one copy of the scoped request message with the message state attribute changed to "Sent" 64-2 is eventually routed to the local handler process with the highest ranking 52-1. No copy of the scoped request message 64-2 is routed to the other eligible local handler processes with lower rankings 52-2.

If no local handler process is selected by the receiving switch 10 and the scoped request message is scoped to a message scope of "Session", the receiving switch updates the message state attribute to "Failed" and generates a reply message 67-1. The reply message with a message state attribute of "Failed" 67-1 is eventually routed back to the originating local sender process 42.

If no local handler process is selected by the receiving switch 10, the scoped request message is scoped to a non-session message scope, and there are other joined switches, the scoped request message 64-3 with the message state attribute changed to "Sent", and the message recipient attribute updated to "Handler Only", is sent to one of the joined switches that has not been sent the non-session scoped request message 64-3, for continued selection and routing to a remote handler process. As described earlier, the joined switch being sent the non-session scoped request message 64-3 is selected arbitrarily from all the joined switches that have not received the non-session scoped request message 64-3. The process is repeated until a remote handler process is found or all these joined switches have been selected. The receiving switch 10 is provided with the remote selection results 66-1 when remote handler processes are not found, by the selected joined switches.

Similarly, if no remote handler process is selected by any of the joined switches for the non-session scoped request message 64-3, the receiving switch 10 updates the message state attribute to "Failed" and generates a reply message 67-1. The reply message with a message state attribute of "Failed" 67-1 is eventually routed back to the originating local sender process 42.

If the scoped request message is handled locally, the handling result 66-1 is sent from the local handler process 52-1 to the receiving switch 10 as input. If the scoped request message is handled remotely, the handling result 66-1 is sent from the handler selecting joined switch to the receiving switch 10 as input. In either case, the receiving switch 10 updates the message state attribute to "Handled" or "Failed" and generates a reply message 67-2.

Copies of the reply message with a message state attribute "Handled" or "Failed" 67-2, 67-3, are eventually routed to all selected local observer processes 54-2, as well as the originating sender process 42. If the reply message 67-2 is a reply message to a non-session scoped request message and there are joined switches that have not received a copy of the reply message 67-2, a copy of the reply message 67-2 with the message recipient attribute changed to "Observers Only" is also sent to all the joined switches that have not received a copy of the reply message 67-2, for continued selection of remote observer processes.

b. Joined Switch

Referring now to FIG. 4b, upon receipt of a non-session scoped request message 64-4 with a message recipient attribute of "Observers Only" from the receiving switch, copies of the non-session scoped request message 64-6 are eventually routed to selected local observer processes (remote to the receiving switch) 55-1.

If a non-session scoped request message 64-4 with a message recipient attribute of "Handler Only" is received from the receiving switch, one copy of the scoped request message with the message state attribute changed to "Sent" 64-5 is eventually routed to the local handler process (remote to the receiving switch) with the highest ranking 53-1, if local handler processes 53-1, 52-2 (remote to the receiving switch) are found. Similarly, no copy of the scoped request message 64-5 is routed to the other eligible local handler processes (remote to the receiving switch) with lower rankings 53-2. Additionally, results of the selection 66-3 are sent by the joined switch 11 to the receiving switch, when the joined switch 11 fails to select a local handler process (remote to the receiving switch).

If the scoped request message is handled locally (remote to the receiving switch), the result 66-2 is sent from the local handler process 53-1 (remote to the receiving switch) to the joined switch 11 as input. The joined switch 11 forwards the received results 66-3 to the receiving switch.

Similarly, upon receipt of a non-session scoped reply message 67-5 with a message recipient attribute of "Observers Only" from the receiving switch, copies of the non-session scoped reply message 67-4 are eventually routed to selected local observer processes (remote to the receiving switch) 55-2.

7. Scoped Notice Message Routing

Figure 5B:
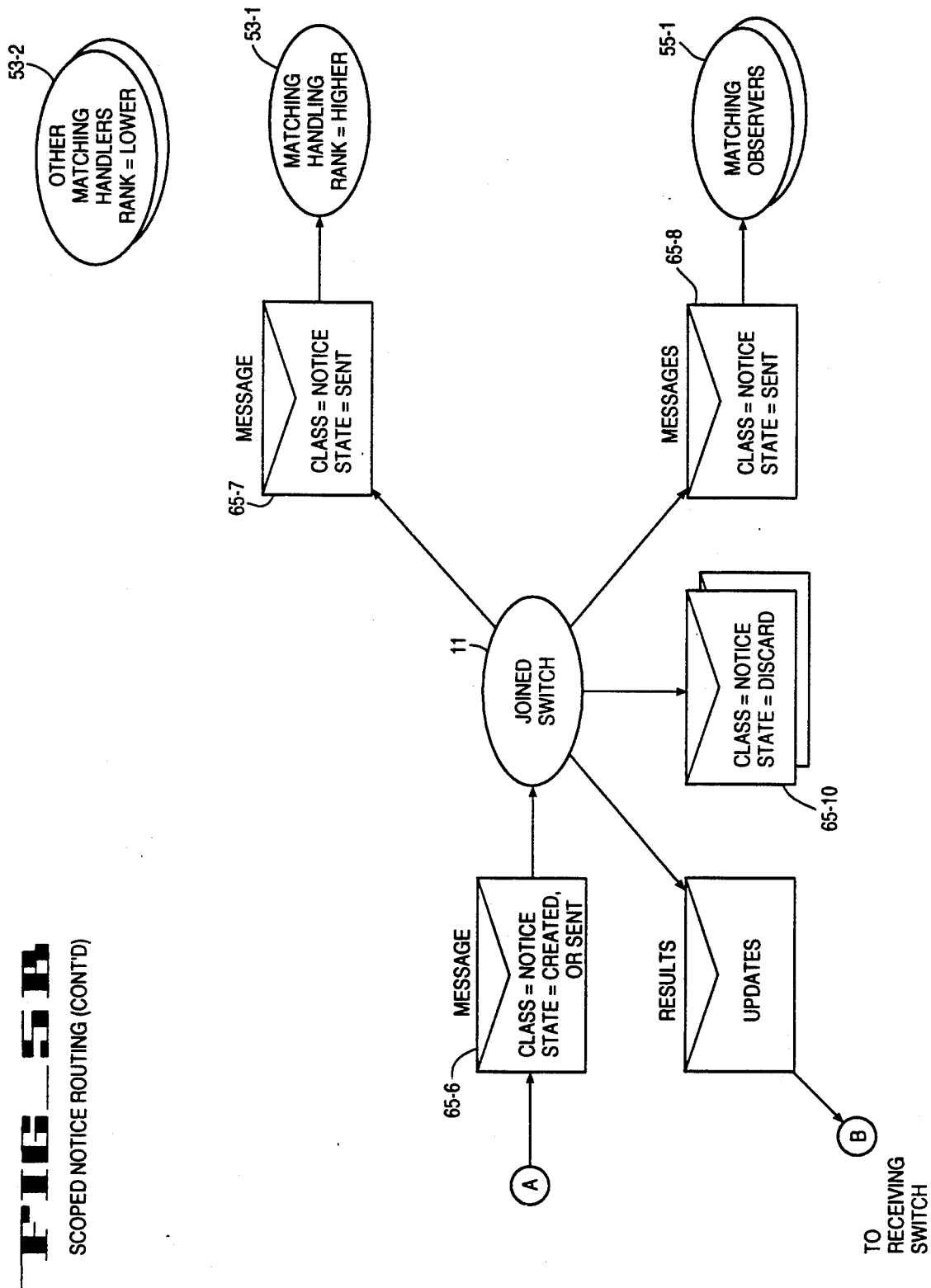

Referring now to FIGS. 5a & 5b, two block diagrams summarizing the routing and disposition of a scoped notice message is shown. Like FIGS. 4a & 4b, the scoped notice messages 65-1 to 65-7, and the results 66-1 to 66-2, relate to the scoped notice messages 65, and the results 66 in FIG. 2. Similarly, the handler processes 52-1, 52-2, 53-1, 53-2 and the observer processes 54-1, 55-1 relate to the handler processes 52, 53 and the observer processes 54, 55 in FIG. 1.

a. Receiving Switch

Referring first to FIG. 5a, initially similar to a scoped request message, a scoped notice message with a message state attribute of "Created" 65-1 is sent to the receiving switch 10 as input. Similarly, copies of the scoped notice message with the message state attribute changed to "Sent" 65-3 are eventually routed to all selected local observer processes 54-1. If the scoped notice message is scoped to a non-session message scope, and there are joined switches, a copy of the scoped notice message 65-4 with the message state attribute changed to "Sent" and the message recipient attribute changed to "Observers Only", is sent to all the joined switches that have not been sent the non-session scoped notice message, for continued selection of remote observer processes.

Likewise, only one copy of the scoped notice message with the message state attribute changed to "Sent" 65-2 is also eventually routed to one selected local handler process 52-1. No one copy of the scoped notice message 65-2 is routed to the other eligible local handler processes with lower rankings 52-2.

Unlike a scoped request message, if the scoped notice message is scoped to a message scope of "Session" and handler process 52-1, 52-2 are not selected, the scoped notice message 65-5 is discarded. If the scoped notice message is scoped to a non-session message scope and handler processes 52-1, 52-2 are not selected, the scoped notice message 65-5 is also discarded if there is no joined switch.

Similar to a scoped request message, if the scoped notice message is scoped to a non-session message scope, no local handler process 52-1, 52-2 is selected and there is at least one joined switch, a copy of the non-session scoped notice message 65-4 with the message state attribute updated to "Sent", and the message recipient attribute changed to "Handler Only", is sent to one of the joined switches for continued selection of remote handler processes. As described earlier, the joined switch being sent the non-session scoped notice message 65-4 is selected arbitrarily from all the joined switches that have not received the non-session scoped notice message 65-4. The process is repeated until a remote handler process is found or all these joined switches have been selected. The receiving switch 10 is provided with the selection results 66-1 when remote handler process is not found, by the selected joined switches.

Also unlike a scoped request message, the selected local handler process 52-1 and the selected joined switch, does not provide handling results to a scoped notice message after the second notice message is handled.

b. Joined Switch

Referring now to FIG. 5b, upon receipt of a non-session scoped notice message 65-6 with a message recipient attribute of "Observers Only" from the receiving switch, copies of the non-session scoped notice message 65-8 are eventually routed to any selected local observers 55-1 (remote to the receiving switch).

If a non-session scoped notice message 65-6 with a message recipient attribute of "Handler Only" is received, one copy of the scoped notice message with the message state attribute changed to "Sent" 65-7 is also eventually routed to one selected local handler process 53-1 (remote to the receiving switch). Again, no copy of the scoped notice message 65-7 is routed to the other eligible local handler processes (remote to the receiving switch) with lower rankings 53-2. Additionally, results of the selection 66-2 is sent by the joined switch 11 to the receiving switch when a handler process is not found. Further, handling results 66-2 are generated and sent by the joined switch 11 to the receiving switch when a handler process is found.

After handling the non-session scoped notice message, the selected local handler process 53-1 (remote to the receiving switch) does not provide handling results to the joined switch 11.

8. Variations

While the apparatus for scoped interprocess message switching of the present invention has been described in terms of a preferred embodiment, it will be understood that the present invention is not limited to the session and non-session message scope types discussed herein. The present invention is also not limited to processes executing in different sessions, on different computers, communicating across a network. Those skilled in the art will recognize that the invention can be practiced with modification and alteration within the spirit and scope of the appended claims to serve a wide variety of scoped interprocess communication situations for processes being executed by the same computer and for processes being executed by different computers in a network.

What is claimed is:

1. In a network of computer systems comprising a sender process, a plurality of receiver processes, and a plurality of message switches, a method for scoped interprocess message switching between said sender process and said receiver processes, said method comprising the steps of:

registering each of said receiver processes with at most one of said message switches on said network of computer systems, each of said registrations comprising registering at least one message pattern for the receiver process being registered, each of said message patterns described scoped messages the receiver process being registered is to receive, said description including the scoped messages' message scope types, said message scope types including a session and at least one non-session identifier message scope type, said description further including the sender process's session identifier if the scoped messages' message scope types are the session message scope type, and non-session message scopes if the scoped messages' message scope types are the at least one non-session message scope type;

joining said switches to appropriate ones of said non-session message scopes on said network of computer systems by said switches enrolling themselves as remote switches for receiving messages scoped with the particular non-session message scopes in response and in accordance to said registrations of said receiver processes receiving scoped messages from said sender process by said switches;

selecting said registered receiver processes by said switches in response to said received scoped messages, each of said scoped messages having message attributes identifying the scoped message's message scope type, the sender process's session identifier if the scoped message's message scope type is the session message scope type, and a non-session message scope if the scoped message's message scope type is the non-session message scope type, said selections being performed by said switches in accordance to said registered information and using said joining relationships between said switches and said non-session message scopes if said scoped messages' message scope types are the at least one non-session message scope type;

queuing copies of said received scoped messages with selected receiver processes by said selecting switches in response to its selection of receiver processes;

signaling said selected receiver processes by said queuing switches regarding the availability of said queued scoped messages in response to its queuing of scoped messages; and delivering said queued scoped messages by said signaling switches, upon request of said signaled receiver processes, to said requesting receiver processes.

2. The method for scoped interprocess message switching between a sender process and a plurality of receiver processes as set forth in claim 1, wherein said step of joining said switches to appropriate ones of said non-session message scopes comprises adding joined records to at least one shared joined list by said switches, said joined records being added when message patterns having message scope type attributes describing the at least one non-session message scope type are being registered with said switches and said switches not having joined to the non-session message scopes, each of said joined records comprising an identifier identifying the joining switch including the switch's session identifier, and a timestamp identifying when the joined record was added.

3. The method for scoped interprocess message switching between a sender process and a plurality of receiver processes as set forth in claim 2, wherein said at least one shared joined list comprises a plurality of lists shared among said switches, and organized on a per non-session message scope type basis.

4. The method for scoped interprocess message switching between a sender process and a plurality of receiver processes as set forth in claim 3, wherein said at least one non-session message scope type comprises a non-session message scope type of "File".

5. The method for scoped interprocess message switching between a sender process and a plurality of receiver processes as set forth in claim 4, wherein said shared joined list of said non-session message scope type "File" comprises a plurality of sub-lists shared among said switching joined to non-session message scopes of said non-session message scope type "File", and organized on a per file basis.

6. The method for scoped interprocess message switching between a sender process and a plurality of receiver processes as set forth in claim 1, wherein each of said scoped messages received from said sender process comprises, a message identifier for the scoped message comprising the sender process' computer identifier, the sender process' process identifier and the sender process' message specific identifier;

a message scope type attribute comprising one of a plurality of session/non-session message scope types, said session/non-session message scope types comprising a session message scope type of "Session", a non-session message scope type of "⇌File", a non-session message scope type of "File in Session" and a non-session message scope type of "File or Session";

a sender identifier attribute comprising the sender process' session identifier;

a message recipient attribute comprising one of a plurality of recipient specifications, said recipient specifications comprising a recipient specification of "Handler Only", a recipient specification of "Observers Only", and a recipient specification of "Both Handler and Observers";

a message dispatched list attribute comprising a plurality of dispatched records, each of said dispatched records comprising a session identifier identifying one of said switches having have the scoped message dispatched to it, and a timestamp marking when the scoped message was dispatched; and a non-session message scope attribute comprising one of a plurality of non-session message scope identifiers identifying the non-session message scope of the scoped message.

7. The method for scoped interprocess message switching between a sender process and a plurality of receiver processes as set forth in claim 1, wherein, the received scoped message is scoped to a non-session message scope and the receiving switch successfully selected a local registered receiver process to handle the received scoped message;

said step of selecting said registered receiver processes by said switches comprises the steps of;

identifying the switches joined to the non-session message scope of the received scoped message by the receiving switch, using said joining relationships between said switches and said non-session message scopes, updating a message recipient attribute of the scoped message to "Observers Only" and a message dispatched list attribute of the scoped message with sessions identifiers of the switches having joined to the non-session message scope of the scoped message by said receiving switches, and sending the updated scoped message to the identified switches by the receiving switch for continued selection of remote observer processes.

8. The method for scoped interprocess message switching between a sender process and a plurality of receiver processes as set forth in claim 1, wherein, the received scoped message is scoped to a non-session message scope and the receiving switch is unsuccessful in selecting a local registered receiver process to handle the received scoped message;

said step of selecting said registered receiver processes by said switches further comprises the steps of;

arbitrarily selecting one of the switches joined to the non-session message scope of the scoped message and not having been sent the scoped message by the receiving switch, updating a message recipient attribute of the scoped message to "Handler Only" and a message dispatched list attribute of the scoped message with the selected switch's session identifier by the receiving switch, and sending the updated scoped message to the selected switch by the receiving switch for continued selection of a receiver process registered with the selected switch to handle the scoped message.

9. The method for scoped interprocess message switching between a sender process and a plurality of receiver processes as set forth in claim 8, wherein said step of selecting said registered receiver processes by said switches further comprises the step of repeating said steps of selecting, updating and sending by the receiving switch, until a receiver process registered with a switch joined to the non-session message scope of the scoped message is found to handle the scoped message, or all switches joined to the non-session message scope of the scoped message have been selected.

10. The method for scoped interprocess message switching between a sender process and a plurality of receiver processes as set forth in claim 9, wherein said step of selecting said registered receiver processes by said switches further comprises the step of providing the receiving switch with the selection results of the selected switch, by the selected switch, when the selected switch fails to select a receiver process registered with the selected switch to handle the scoped message.

11. In a network of computer systems comprising a sender process, and a plurality of receiver processes, an apparatus for scoped interprocess message switching between said sender process and said receiver processes, said apparatus comprising:

a plurality of substantially identical message switches for receiving scoped messages from said sender process and delivering the received scoped messages to said receiver processes, each of said scoped messages having a first message attribute identifying the scoped message's message scope type, said message scope types including a session and at least one non-session message scope type, each of said scoped messages further having a second message attribute identifying the sender process's session identifier if the scoped message's message scope type is the session message scope type, and a third message attribute identifying a non-session message scope if the scoped message's message scope type is the non-session message scope type, each of said message switches having registration means for registering a subset of said receiver processes, each of said receiver processes being registered with at most one of said message switches, each of said registrations comprising registering at least one message pattern for the receiver process being registered, each of said message patterns describing scoped messages the receiver process being registered is to receive, said descriptions including the scoped messages' message scope types, said descriptions further including the sender process' session identifier if the scoped messages' message scope types are the session message scope type, and non-session message scopes if the scoped messages' scope types are the at least one non-session message scope type;

selection means coupled with said registration means for selecting receiver processes registered with the switch to receive said scoped messages sent by said sender process in response to receiving said scoped messages;

queueing means coupled with said selection means for queuing copies of said scoped messages with selected receiver processes in response to said selection of receiver process, signaling means coupled to said queueing means for signaling said selected receiver processes, regarding the availability of said queued scoped messages in response to said queuing of scoped messages, and delivery means coupled to said queueing means for delivering said queued scoped messages, upon request of said signaled receiver processes, to said requesting receiver processes; and joining means coupled to said registration and selection means of said switches for joining said switches to appropriate ones of a plurality of non-session message scopes, said switches joining themselves to the appropriates ones of said non-session message scopes by enrolling themselves as remote switches for receiving messages scoped with the particular non-session message scope in response and in accordance to said registrations of said receiver processes, said selections of receiver processes being performed by said switches in accordance to said registrations and using said joining relationships between said switches and said non-session message scopes if said scoped messages' message scope types are the at least one non-session message scope type.

12. The apparatus for scoped interprocess message switching between a sender process and a plurality of receiver processes as set forth in claim 11, wherein said joining means comprises at least one shared joined list, each of said at least one shared joined list having a plurality of joined records, said joined records being added when message patterns describing the at least one non-session message scope type are being registered with said switches, and said switches not having joined to the non-session message scopes, each of said joined records comprising an identifier identifying the joining switch including the switch's session identifier, and a timestamp identifying when the joined record was added.

13. The apparatus for scoped interprocess message switching between a sender process and a plurality of receiver processes as set forth in claim 12, wherein said at least one shared joined list comprises a plurality of lists shared among said switches, and organized on a per non-session message scope type basis.

14. The apparatus for scoped interprocess message switching between a sender process and a plurality of receiver processes as set forth in claim 13, wherein said at least one non-session message scope type comprises a non-session message scope type of "File".

15. The apparatus for scoped message switching between a sender process and a plurality of receiver processes as set forth in claim 14, wherein said shared joined list of said non-session message scope type "File" comprises a plurality of sub-lists shared among said switches joined to non-session message scopes of said non-session message scope type "File", and organized on a per file basis.

16. The apparatus for scoped interprocess message switching between a sender process and a plurality of receiver processes as set forth in claim 11, wherein each of said scoped messages received from said sender process comprises, a message identifier for the scoped message comprising the sender process' computer identifier, the sender process' process identifier and the sender process' message specific identifier;

a message scope type attribute comprising one of a plurality of session/non-session message scope types, said session/non-session message scope types comprising a session message scope type of "Session", a non-session message scope type of "File", a non-session message scope type of "File in Session" and a non-session message scope type of "File or Session";

a sender identifier attribute comprising the sender process' session identifier;

a message recipient attribute comprising one of a plurality of recipient specifications, said recipient specifications comprising a recipient specification of "Handler Only", a recipient specification of "Observer Only" and a recipient specification of "Both Handler and Observes";

a message dispatched list attribute comprising a plurality of dispatched records, each of said dispatched records comprising a session identifier identifying one of said switches having have the scoped message dispatched to it, and a timestamp marking when the scoped message was dispatched;

a non-session message scope attribute comprising one of a plurality of non-session message scope identifiers identifying the non-session message scopes of the scoped message.

17. The apparatus for scoped interprocess message switching between a sender process and a plurality of receiver processes as set forth in claim 11, wherein, each of said selection means of said switches comprises checking means for selecting any number of said switches having joined to the non-session message scope of a scoped message and have not been sent the scoped message, to receive the scoped message for remote selection of receiver processes to observe the scoped message, each of said checking means of said selection means of said switches performs said selection by checking joined records in at least one shared joined list of said joining means; each of said checking means of said selection means of said switches further updates message attributes of the scoped message and sends the updated scoped message to the selected switches, said updates comprising updating a message recipient attribute to "Observers Only" and a message dispatched list attribute with session identifiers of the selected switches;

each of said checking means of said selection means of said switches performs said selection of switches when the scoped message is scoped to the at least one non-session message scope type and, its selection means is successful in selecting a receiver process registered with its switch to handle the scoped message.

18. The apparatus for scoped interprocess message switching between a sender process and a plurality of receiver processes as set forth in claim 11, wherein, each of said selection means of said switches comprising checking means for selecting one of said switches having joined to the non-session message scope of a scoped message and have not been sent the scoped message, to receive the scoped message for remote selection of a receiver process to handle the scoped message;

each of said checking means of said selection means of said switches performs said selection by checking joined records in at least one shared joined list of said joining means;

each of said checking means of said selection means of said switches further updates message attributes of the scoped message and sends the updated scoped message to the selected switch, said updates comprising updating a message recipient attribute to "Handlers Only", a message handler's program type attribute with a handler program type and a message dispatched list attribute with the selected switch's session identifier;

each said checking means of said selection means of said switches performs said selection of a switch when the scoped message is scoped to the at least one non-session message scope type, and its selection means is unsuccessful in selecting a receiver process registered with its switch to handle the scoped message.

19. The apparatus for scoped interprocess message switching between a sender process and a plurality of receiver processes as set forth in claim 18, wherein, the checking means of the selection means of the receiving switch of the scoped message repeats said selection of a switch until a receiver process is selected by a selected switch to handle the scoped message of all switches joined to the non-session message scope of the scoped message have been selected.

20. The apparatus for scoped interprocess message switching between a sender process and a plurality of receiver processes as set forth in claim 19, wherein, each of said selected switch provides the receiving switch of the scoped message with its selection results when the selected switch fails to select a receiver process registered with the selected switch to handle the scoped message.

* * * * *

UNITED STATES PATENT AND TRADEMARK OFFICE
CERTIFICATE OF CORRECTION

PATENT NO.   : 5,335,347
DATED        : Aug. 2, 1994
INVENTOR(S)  : Foss, et al.

It is certified that error appears in the above-identified patent and that said Letters Patent is hereby corrected as shown below:

[75] Inventors:  delete "Carolyn L. Foss, Palo Alto; Dwight F. Hare, Menlo Park; Richard F. McAllister, Palo Alto; Tin A. Nguyen, Danville; Amy Pearl, Mountain View; Sami Shalo, Palo Alto, all of Calif." and insert --Carolyn L. Foss, Palo Alto; Dwight F. Hare, Menlo Park; Richard F. McAllister, Palo Alto; Tin A. Nguyen, Danville; Amy Pearl, Mountain View; Sami Shaio, Palo Alto, all of Calif.--

Signed and Sealed this

Twenty-eight Day of February, 1995

Attest:

BRUCE LEHMAN

*Attesting Officer*            *Commissioner of Patents and Trademarks*